Oct. 8, 1963     L. K. V. SUDROW     3,106,370
STABILIZING AND FORWARD THRUST AUGMENTING
MEANS FOR ROTOR SUSTAINED AIRCRAFT
Filed Sept. 18, 1961

INVENTOR.
LYLE K. V. SUDROW
BY *Knox & Knox*

United States Patent Office 3,106,370
Patented Oct. 8, 1963

3,106,370
STABILIZING AND FORWARD THRUST AUGMENTING MEANS FOR ROTOR SUSTAINED AIRCRAFT
Lyle K. V. Sudrow, Los Angeles, Calif., assignor to Helipod, Inc., Oceanside, Calif.
Filed Sept. 18, 1961, Ser. No. 138,650
3 Claims. (Cl. 244—17.19)

The present invention relates generally to aircraft and more particularly to stabilizing and forward thrust augmenting means for rotor sustained aircraft.

The primary object of this invention is to provide means for stabilizing a rotor sustained aircraft by guiding the airflow from the rotor and utilizing deflection of the guided airflow to produce directional thrust.

Another object of this invention is to provide stabilizing means in the form of a fin mounted at the rear of the aircraft below the rotor, the portion of the aircraft to which the fin is attached having a scoop-like configuration, by which the rotor airflow is deflected rearwardly to cause a forward thrust reaction.

A further object of this invention is to provide a stabilizing means which is effective at all flight speeds and in any direction.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
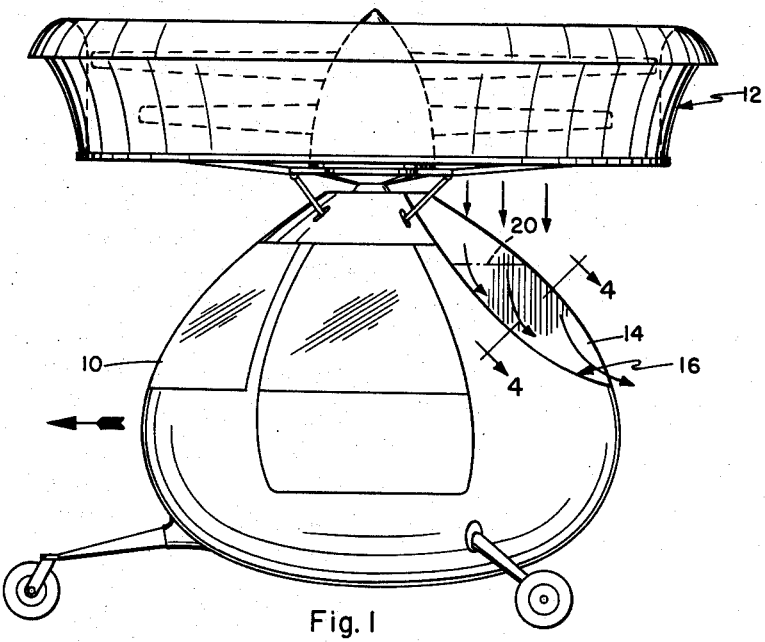
FIGURE 1 is a side elevation view of an aircraft incorporating the stabilizing means.
Figure 2:
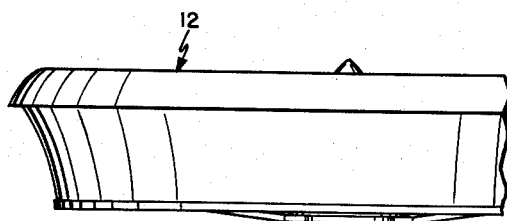
FIGURE 2 is a partial rear elevation view thereof.

The stabilization means is applicable to various types of rotor sustained aircraft, in the broad category of helicopters, in which a rotor is mounted above a fuselage or cabin structure. However, the configuration is particularly adaptable to the vehicle shown and described in my copending application Serial No. 124,566, filed July 17, 1961, and entitled "Aircraft," this aircraft being illustrated by way of an example.

General Structure

The aircraft has a fuselage or cabin 10 on top of which is mounted a ducted sustaining rotor 12, which provides the necessary lift and directs airflow downwardly over the cabin. Such details as propulsive power, controls and the like are variable, one complete system being described in the above mentioned copending application. At the rear of the cabin 10 is a fin 14 in a generally vertical plane and extending from the upper portion to the rear of said cabin, the fin being fully exposed to airflow from rotor 12. The portion of the cabin on which fin 14 is mounted is concave and forms a downwardly and rearwardly curving, thrust augmenting scoop portion 16 with walls 18 extending laterally on either side of said fin.

Figure 4:
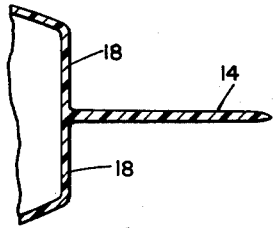
FIGURE 4 is an enlarged sectional view taken on the line 4—4 of FIGURE 1.
Figure 3:
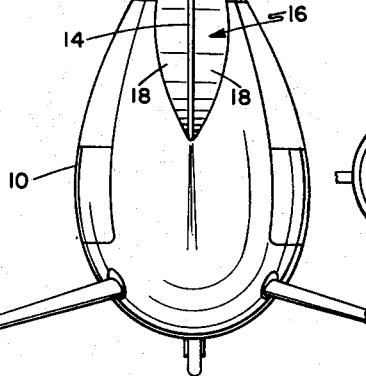
FIGURE 3 is a partial top plan view thereof.

As indicated in FIGURE 4, the fin 14 is flat sided and thin in cross section and may be made from reinforced plastic material integral with cabin 10, or as a separate component to be attached in any well known manner.

Operation

At all times during flight of the aircraft there is a downward airflow from the rotor 12 which flows over the fin 14, the vane effect of said fin providing a stabilizing action and preventing oscillation of the cabin 10 beneath the rotor. In addition to the stabilization, the airflow passing over the fin 14 is deflected rearwardly by the scoop portion 16, as indicated by directional arrows in FIGURE 1. The resultant reaction provides a useful forward thrust. In aircraft using only a rotor for lift and propulsion, forward speed is limited by the fact that the rotor, due to necessary compromises, is relatively inefficient as a propeller. Thus any additional forward thrust which can be obtained is most desirable.

The aircraft as illustrated, and other types of rotor sustained aircraft, are capable of flight in virtually any direction including vertically up or down. Since the fin 14 is exposed at all times to the rotor airflow, the stabilizing effect is continuous.

If necessary, trim or offset directional control may be obtained by making a portion of fin 14 separate and adjustable, as indicated by broken line 20 in FIGURE 1. In aircraft using a single rotor, such an arrangement could be used to counteract torque, although with counter-rotating rotors this is not necessary.

The fin is extremely simple in structure, light in weight and provides considerable stability, with the added provision of augmented thrust from the portion of the aircraft on which the fin is mounted.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:
1. In an aircraft:
 a fuselage structure;
 a driven sustaining rotor mounted above said fuselage structure;
 a scoop in the rear portion of said fuselage structure;
 said scoop extending downwardly and rearwardly from adjacent said rotor and being exposed to the airflow from the rotor to deflect airflow rearwardly and produce a forward thrust reaction against said fuselage.
2. In an aircraft:
 a fuselage structure;
 a driven sustaining rotor mounted above said fuselage structure;
 a stabilizing fin fixed on the rear portion of said fuselage structure in a substantially vertical plane;
 said fin being exposed to the airflow from said rotor;
 the part of said fuselage structure adjacent said fin having a downwardly and rearwardly extending scoop-like portion, whereby the airflow from said rotor is deflected rearwardly to provide a forward thrust reaction.
3. In an aircraft:
 a fuselage structure;
 a driven sustaining rotor mounted above said fuselage structure;
 a stabilizing fin fixed on the rear portion of said fuselage structure in a substantially vertical plane;
 said fin being exposed to the air flow from said rotor;

the part of said fuselage on which said fin is mounted having concave, downwardly and rearwardly extending scoop-like portions extending on each side of and substantially perpendicular to the fin, whereby the airflow from said rotor is deflected rearwardly to provide a forward thrust reaction.

References Cited in the file of this patent
UNITED STATES PATENTS

| | | |
|---|---|---|
| 2,466,821 | Owen | Apr. 12, 1949 |
| 2,486,272 | Gazda | Oct. 25, 1949 |
| 2,966,318 | Chodan | Dec. 12, 1960 |